(12) United States Patent
Ito et al.

(10) Patent No.: US 11,231,176 B2
(45) Date of Patent: Jan. 25, 2022

(54) COMBUSTION DEVICE AND GAS TURBINE

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 65 days.

(21) Appl. No.: 16/534,737

(22) Filed: Aug. 7, 2019

(65) Prior Publication Data

US 2020/0003420 A1    Jan. 2, 2020

Related U.S. Application Data

(63) Continuation of application No. PCT/JP2018/011893, filed on Mar. 23, 2018.

(30) Foreign Application Priority Data

Mar. 27, 2017  (JP) .............................. JP2017-060445

(51) Int. Cl.
*F23R 3/16*       (2006.01)
*F02C 3/24*       (2006.01)
(Continued)

(52) U.S. Cl.
CPC .................. *F23R 3/16* (2013.01); *F02C 3/24* (2013.01); *F23R 3/002* (2013.01); *F23R 3/28* (2013.01); *F23R 3/40* (2013.01)

(58) Field of Classification Search
CPC ...... F02C 3/22; F02C 3/24; F02C 3/30; F02C 7/232; F02C 9/36; F02C 9/40;
(Continued)

(56) References Cited

U.S. PATENT DOCUMENTS 2,987,873 A    6/1961  Fox
5,199,255 A    4/1993  Sun et al.
(Continued)

FOREIGN PATENT DOCUMENTS

CN    1142036 A    2/1997
CN    1214430 A    4/1999
(Continued)

OTHER PUBLICATIONS

Database WPI; Week 200420; Thomson Scientific, London, GB; AN 2004-207698; XP002800795,& JP 2004 036983 A (Mitsubishi Jukogyo KK); Feb. 5, 2004.

*Primary Examiner* — Jason H Duger
(74) *Attorney, Agent, or Firm* — Rothwell, Figg, Ernst & Manbeck, P.C.

(57) ABSTRACT

A combustion device burns fuel ammonia with combustion air in a combustion chamber, and includes: a combustor liner which forms the combustion chamber; a burner which is installed at one end of the combustor liner; a deflection member which is provided on a downstream side of the combustor liner in a flow direction of a combustion gas, and is configured to deflect the flow direction of the combustion gas; and at least one ammonia injection hole which is provided between the burner and an outlet of the deflection member and is configured to supply the fuel ammonia into the combustion chamber.

9 Claims, 2 Drawing Sheets

(51) Int. Cl.
*F23R 3/00* (2006.01)
*F23R 3/28* (2006.01)
*F23R 3/40* (2006.01)

(58) Field of Classification Search
CPC .... F23R 3/002; F23R 3/16; F23R 3/20; F23R 3/22; F23R 3/28; F23R 3/30; F23R 3/34; F23R 3/36; F23R 3/40; F23R 2900/00002; F01N 3/2066; F01N 2610/02; F01D 9/023; F01D 25/305; F05D 2270/082
See application file for complete search history.

(56) References Cited

U.S. PATENT DOCUMENTS

| | | | |
|---|---|---|---|
| 5,829,967 | A | 11/1998 | Chyou |
| 2005/0204741 | A1 | 9/2005 | Simons et al. |
| 2009/0084082 | A1 | 4/2009 | Martin et al. |
| 2010/0071376 | A1* | 3/2010 | Wiebe ................... F23R 3/60 60/740 |
| 2010/0174466 | A1* | 7/2010 | Davis, Jr ................. F02C 7/22 701/100 |
| 2012/0036825 | A1 | 2/2012 | Kasuga et al. |
| 2012/0279226 | A1* | 11/2012 | Chen ...................... F01D 9/023 60/772 |
| 2013/0167548 | A1 | 7/2013 | Popovic et al. |
| 2013/0318991 | A1* | 12/2013 | DiCintio ................. F23R 3/34 60/774 |

FOREIGN PATENT DOCUMENTS

| | | | |
|---|---|---|---|
| DE | 202004017725 U1 | | 2/2005 |
| JP | 59-059671 A | | 4/1984 |
| JP | 61-043675 A | | 3/1986 |
| JP | 02-308926 A | | 12/1990 |
| JP | 2004-036983 A | | 2/2004 |
| JP | 2005-265403 A | | 9/2005 |
| JP | 2010-539437 A | | 12/2010 |
| JP | 2013-139784 A | | 7/2013 |
| JP | 2015-094496 A | | 5/2015 |
| JP | 2015094496 A | * | 5/2015 |
| JP | 2016-191507 A | | 11/2016 |
| WO | 2010/082359 A1 | | 7/2010 |

* cited by examiner

COMBUSTION DEVICE AND GAS TURBINE

CROSS-REFERENCE TO RELATED APPLICATIONS

This application is a Continuation Application based on International Application No. PCT/JP2018/011893, filed Mar. 23, 2018, which claims priority on Japanese Patent Application No. 2017-060445, filed Mar. 27, 2017, the contents of which are incorporated herein by reference.

TECHNICAL FIELD

The present disclosure relates to a combustion device and a gas turbine.

BACKGROUND

Patent Document 1 discloses a combustion device and a gas turbine which burn ammonia as a fuel. The combustion device and the gas turbine obtain a combustion exhaust gas used to drive a turbine by premixing ammonia (fuel ammonia) with natural gas and supplying it to a combustor. In order to reduce nitrogen oxides ($NO_x$), a reduction region in which the nitrogen oxides ($NO_x$) generated in a combustion region are reduced using reducing ammonia is formed on a downstream side of the combustor.

A deflection member, which is called a transition piece (or a scroll), is provided downstream from the combustor so as to connect the combustor with an inlet of the turbine, and deflects a flow direction of combustion gas. This deflection member includes an inlet portion which corresponds to a cross-sectional shape of the combustor, an outlet portion which corresponds to a shape of a part of the inlet of the turbine, and a bending portion in which a cross-sectional shape of the deflection member gradually deforms from the inlet portion toward the outlet portion.

DOCUMENT OF RELATED ART

Patent Document

[Patent Document 1] Japanese Unexamined Patent Application, First Publication No. 2016-191507

SUMMARY

When the combustion gas flows in the deflection member, heat exchange between the deflection member and the combustion gas is promoted, for example, by a collision of the combustion gas with the bending portion of the deflection member or by a high-speed flow of the combustion gas near the outlet portion of the deflection member. At this time, in the deflection member, a high temperature portion which has a high temperature due to the flow or collision of the combustion gas and a low temperature portion which has a relatively low temperature are likely to be formed, and due to the temperature difference, damage such as thermal deformation or cracking may occur.

The present disclosure has been made in view of the above-described problems, and an object thereof is to minimize damage such as thermal deformation or cracking in a deflection member provided between a combustion chamber and an inlet of a turbine caused by a temperature difference.

A combustion device according to an aspect of the present disclosure is a combustion device which burns fuel ammonia with combustion air in a combustion chamber, and includes: a combustor liner which forms the combustion chamber; a burner which is installed at one end of the combustor liner; a deflection member which is provided on a downstream side of the combustor liner in a flow direction of a combustion gas, and is configured to deflect the flow direction of the combustion gas; and at least one ammonia injection hole which is provided between the burner and an outlet of the deflection member and is configured to supply the fuel ammonia into the combustion chamber.

In the combustion device according to the aspect, the at least one ammonia injection hole may be provided in a side wall of the combustor liner.

In the combustion device according to the aspect, the at least one ammonia injection hole may include a plurality of ammonia injection holes, and the plurality of ammonia injection holes may be provided in the side wall of the combustor liner to be asymmetric around a central axis of the combustion chamber.

In the combustion device according to the aspect, a high temperature portion in which a temperature is higher than an average temperature in the deflection member may be identified in advance, and the at least one ammonia injection hole may be disposed such that the temperature of the high temperature portion is lowered by the fuel ammonia supplied from the at least one ammonia injection hole.

In the combustion device according to the aspect, a high temperature portion in which a temperature is higher than an average temperature in the deflection member may be identified in advance, and a supply amount of the fuel ammonia supplied from the at least one ammonia injection hole may be adjusted such that the temperature of the high temperature portion is lowered by the fuel ammonia supplied from the at least one ammonia injection hole.

A gas turbine according to an aspect of the present disclosure includes the combustion device.

According to the present disclosure, fuel ammonia is supplied into a combustor liner from an ammonia injection hole, a combustion field in which the fuel ammonia is burned is formed, and burned ammonia gas having a relatively low temperature is generated. The burned ammonia gas collides with or flows to a portion which is likely to have a high temperature in the deflection member, and it is possible to minimize damage such as thermal deformation or cracking in the deflection member due to a temperature difference.

DESCRIPTION OF EMBODIMENTS

Hereinafter, an embodiment of the present disclosure will be described with reference to the drawings.

Figure 1:
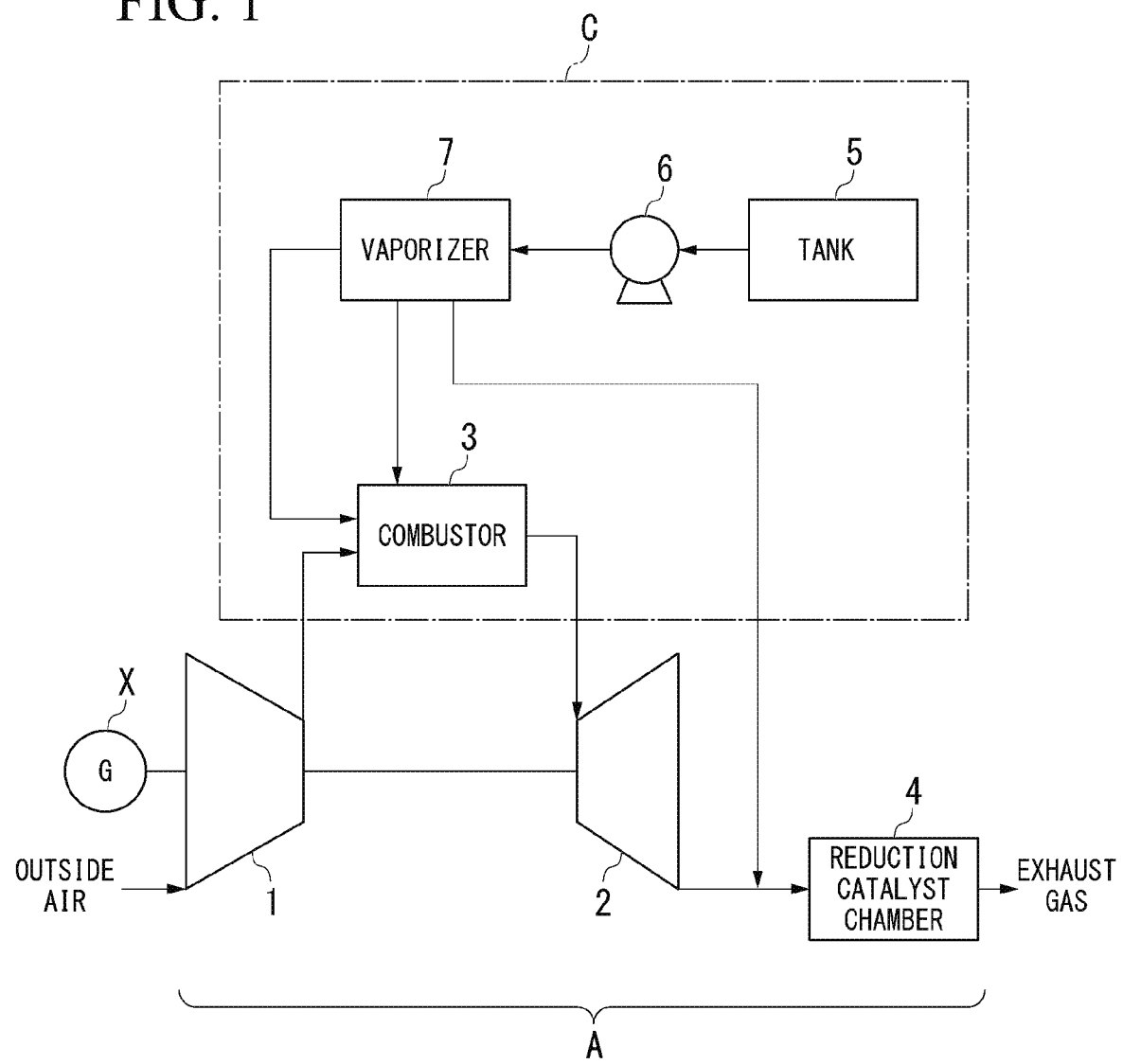
FIG. 1 is a block diagram showing an overall constitution of a combustion device and a gas turbine according to an embodiment of the present disclosure.

As shown in FIG. 1, a gas turbine A according to the embodiment includes a compressor 1, a turbine 2, a combustor 3, a reduction catalyst chamber 4, a tank 5, a pump 6, and a vaporizer 7. Among these elements, the combustor 3, the tank 5, the pump 6, and the vaporizer 7 constitute a combustion device C in this embodiment. A gas turbine A is a drive source of a generator G and generates rotational power by burning ammonia which is fuel.

The compressor 1 compresses air taken from the outside to a predetermined pressure to generate compressed air. The compressor 1 supplies the compressed air which mainly serves as combustion air to the combustor. The combustor 3 generates a flame K obtained by burning natural gas and ammonia supplied to a burner 3c, and burns gaseous ammonia supplied from the vaporizer 7 as a fuel. That is, the combustor 3 generates a combustion gas by burning the natural gas and the gaseous ammonia using the compressed air as an oxidant and supplies the combustion gas to the turbine 2.

The turbine 2 generates rotational power using the combustion gas as a driving gas.

As shown in the drawings, the turbine 2 is axially connected to the compressor 1 and the generator G and rotationally drives the compressor 1 and the generator G using its own rotational power. The turbine 2 exhausts the combustion gas after power recovery toward the reduction catalyst chamber 4. The reduction catalyst chamber 4 is filled with a reduction catalyst, and nitrogen oxides ($NO_x$) contained in the combustion gas are reduced to nitrogen ($N_2$) by performing reduction treatment on the nitrogen oxides ($NO_x$).

The tank 5 is a fuel tank which stores a predetermined amount of liquefied ammonia and supplies the liquefied ammonia to the pump 6. The pump 6 is a fuel pump which pressurizes the liquefied ammonia supplied from the tank 5 to a predetermined pressure and supplies the pressurized liquefied ammonia to the vaporizer 7. The vaporizer 7 can generate gaseous ammonia by vaporizing the liquefied ammonia supplied from the pump 6.

The vaporizer 7 is connected to an ammonia injection hole 3b provided in a side wall 3f of a combustor liner 3a which will be described later and supplies the ammonia to the combustor 3 as the gaseous ammonia (fuel ammonia). Further, the vaporizer 7 supplies the gaseous ammonia to a portion immediately before the combustor 3 and the reduction catalyst chamber 4 as a reducing agent (reducing ammonia). The reduction catalyst chamber 4 performs reduction treatment on the nitrogen oxides ($NO_x$) using cooperation between the reduction catalyst stored in the reduction catalyst chamber 4 and the reducing ammonia.

Here, the combustor 3 will be described in detail with reference to FIGS. 2 to 4.

Figure 2:
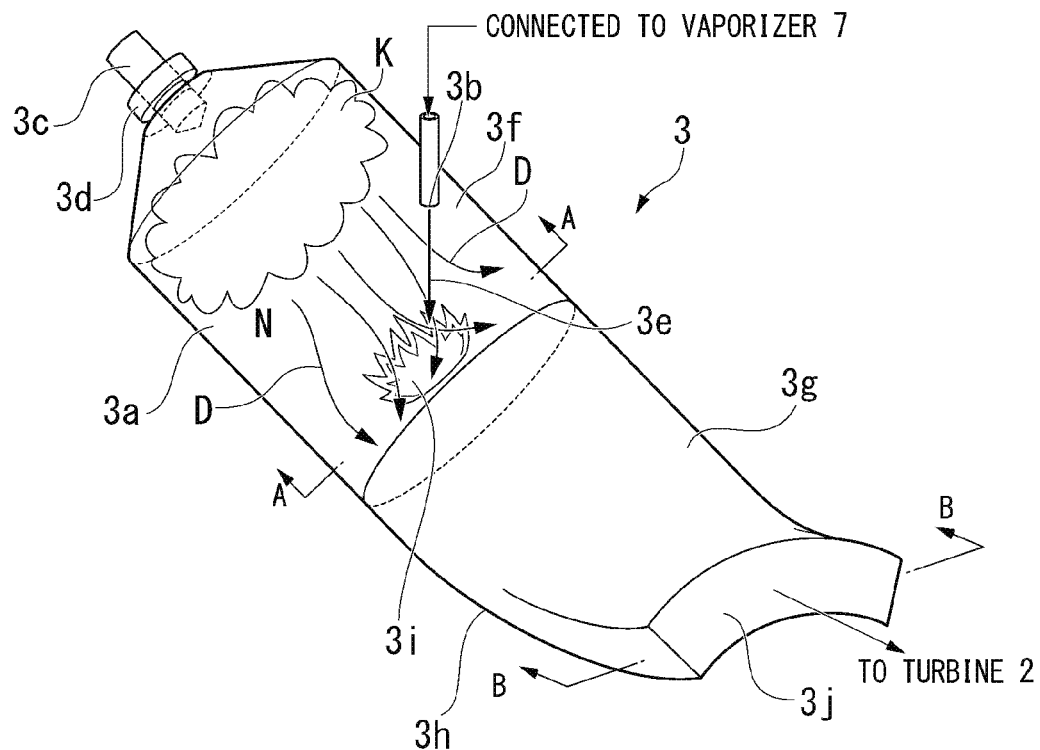
FIG. 2 is a perspective view showing a constitution of a combustor according to the embodiment of the present disclosure.

The combustor 3 includes the combustor liner 3a, the burner 3c, a rectifier 3d, and a deflection member 3g, as shown in FIG. 2.

The burner 3c and the rectifier 3d are installed at one end (a first end) of the combustor liner 3a. The deflection member 3g is formed at the other end (a second end) of the combustor liner 3a. The combustor liner 3a is a cylindrical body, and an internal space of the combustor liner 3a forms a combustion chamber N. A direction of an arrow in FIG. 2 is a flow direction of the combustion gas D in the combustion chamber N.

The burner 3c is a fuel injection nozzle which is provided on a central axis of the combustor liner 3a at one end of the combustor liner 3a and injects the natural gas flame K into the combustion chamber N. The rectifier 3d is annularly provided on an outer periphery of the burner 3c at one end of the combustor liner 3a and supplies the combustion air in a direction from the burner 3c toward the deflection member 3g.

The ammonia injection hole 3b is provided in the side wall 3f of the combustor liner 3a, and the ammonia injection hole 3b is connected to the vaporizer 7. The ammonia injection hole 3b can supply the gaseous ammonia from the vaporizer 7 into the combustor liner 3a.

The deflection member 3g is provided downstream from the combustor liner 3a in the flow direction of the combustion gas D. One end (an inlet portion, a first end) of the deflection member 3g has a cross-sectional shape corresponding to the combustor liner 3a and is connected to the combustor liner 3a. The other end (an outlet portion 3j, a second end) of the deflection member 3g has a cross-sectional shape corresponding to a part of an inlet of the turbine 2 and is connected to the inlet of the turbine 2.

Further, the deflection member 3g has a bending portion 3h in which a shape of the deflection member 3g is gradually deformed from one end of the deflection member 3g toward the other end. The deflection member 3g causes the burned ammonia gas and the combustion gas D to flow in the deflection member 3g and deflects the flow directions of the burned ammonia gas and the combustion gas D toward the inlet of the turbine 2. Furthermore, in the outlet portion 3j of the deflection member 3g, the deflection member 3g causes the burned ammonia gas and the combustion gas D to flow at a high speed.

In designing the combustor 3 having the above-described constitution, it is preferable to identify in advance a high temperature portion in which a temperature becomes higher than an average temperature in the deflection member 3g. When the high temperature portion having a temperature higher than the average temperature in the deflection member 3g is identified, it is preferable that arrangement of the ammonia injection hole 3b be adjusted so that the temperature of the high temperature portion is lowered by the fuel ammonia supplied from the ammonia injection hole 3b. Alternatively, it is preferable that a supply amount of the fuel ammonia supplied from the ammonia injection hole 3b be adjusted so that the temperature of the high temperature portion is lowered by the fuel ammonia supplied from the ammonia injection hole 3b.

For example, it is preferable that the arrangement of the ammonia injection hole 3b or the supply amount of fuel ammonia supplied from the ammonia injection hole 3b be adjusted so that the fuel ammonia collides with the high temperature portion or flows along the high temperature portion. The fuel ammonia for lowering the temperature of the high temperature portion may be a burned gas of the fuel ammonia or may be an unburned fuel ammonia.

Next, time-series operations of the gas turbine A and the combustion device C according to the embodiment will be described in detail.

In the gas turbine A and the combustion device C, the liquefied ammonia is supplied from the tank 5 to the vaporizer 7 by operating the pump 6, the liquefied ammonia is vaporized in the vaporizer 7, and thus the gaseous ammonia is generated. Then, a part of the gaseous ammonia is supplied into the combustor liner 3a as the fuel ammonia, and the remaining gaseous ammonia is supplied to the portion immediately before the reduction catalyst chamber 4 as the reducing ammonia.

The burner 3c injects the natural gas and the ammonia into the combustion air swirled by the rectifier 3d and generates the flame K. The combustion gas D of the flame K flows in the combustion chamber N. At this time, a swirling flow of the combustion gas D is generated around the central axis of the combustor liner 3a.

Figure 3:
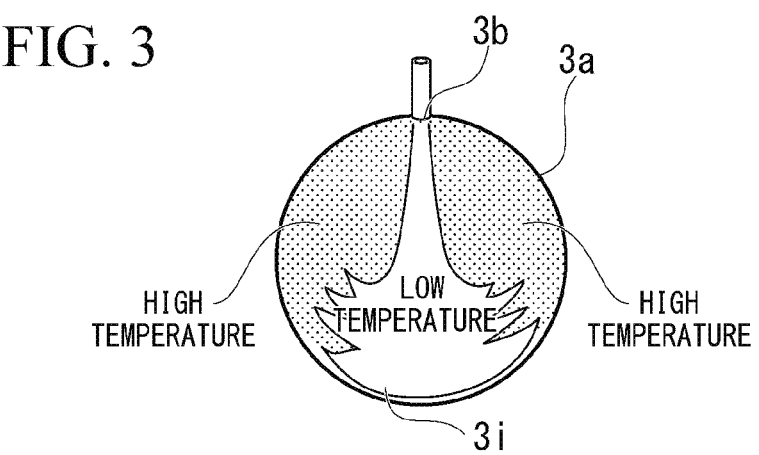
FIG. 3 is a view showing a constitution of the combustor according to the embodiment of the present disclosure, which is a view taken along line A-A in FIG. 2 and is a cross-sectional view showing a combustion chamber.
Figure 4:
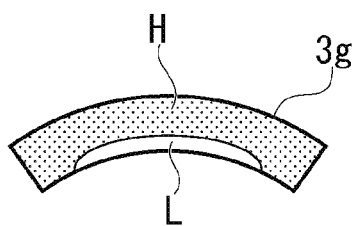
FIG. 4 is a view showing a constitution of the combustor according to the embodiment of the present disclosure, which is a view taken along line B-B in FIG. 2 and is a cross-sectional view showing a deflection member.

As shown in FIG. 3, the gaseous ammonia is injected from the ammonia injection hole 3b toward an inner wall surface facing the ammonia injection hole 3b. In the combustion chamber N, as the gaseous ammonia burns with remaining oxygen in the combustion gas D, an ammonia combustion field 3i is formed in the combustion chamber N, and a burned ammonia gas is generated. The ammonia combustion field 3i is formed to push away the combustion gas D having a high temperature.

Ammonia has a property of a lower calorific value than a hydrocarbon fuel. Therefore, the burned ammonia gas generated from the ammonia combustion field 3i has a relatively lower temperature than the combustion gas D. Since the combustion temperature of the ammonia is low, a cross section of the combustor 3 after the gaseous ammonia is injected from the ammonia injection hole 3b has a biased temperature distribution in which the high temperature portion of the combustion gas D (hydrocarbon combustion gas) pushed away by the gaseous ammonia, and the low temperature portion of the burned ammonia gas are present.

Since the swirling flow of the combustion gas D is generated, a position of the ammonia combustion field 3i changes according to the swirling flow. Further, in the combustion chamber N, the ammonia combustion field 3i also swirls as it goes downstream. As the gaseous ammonia is injected from the ammonia injection hole 3b toward the combustion chamber N as shown in FIG. 3, the gaseous ammonia is burned while pushing away the relatively uniform flow of the combustion gas D formed by the burner 3c.

The combustion gas D having a high temperature and the burned ammonia gas having a low temperature form the swirling flow and flow from the ammonia combustion field 3i toward the deflection member 3g. At this time, as shown in FIG. 4, in the deflection member 3g, a low temperature region L in which the burned ammonia gas flows and a high temperature region H in which the combustion gas D having a high temperature flows are generated. In particular, the low temperature region L is formed in a portion of the bending portion 3h of the deflection member 3g which is likely to have a high temperature due to the collision of the combustion gas. Further, the low temperature region L is formed in a portion of the outlet portion 3j of the deflection member 3g which is likely to have a high temperature due to the high speed flow of the combustion gas.

According to the embodiment, since the low temperature region L in which the burned ammonia gas having a low temperature flows is formed in a portion, between the combustion chamber and the inlet of the turbine, which is conventionally likely to have a high temperature, for example, in a portion of the deflection member 3g which is likely to have a high temperature, it is possible to minimize damage such as thermal deformation or cracking in the deflection member 3g due to a temperature difference between the high temperature portion and the low temperature portion.

Although an embodiment and a modified example of the present disclosure have been described above with reference to the drawings, the present disclosure is not limited to the above-described embodiment and modified example. The shapes, combinations, and the like of the elements shown in the above-described embodiment and modified example are merely examples, and various changes can be made based on design requirements and the like without departing from the spirit of the present disclosure. For example, the following modified examples can be considered.

(1) Although the embodiment relates to the case in which the present disclosure is applied to the combustion device C of the gas turbine A, the present disclosure is not limited thereto. The combustion device according to the present disclosure is applicable to various devices other than the gas turbine A, such as a boiler and an incinerator.

(2) Although the number of ammonia injection holes 3b provided in the side wall 3f is one in the above-described embodiment, the number of ammonia injection holes 3b may be plural. In this case, a plurality of ammonia injection holes 3b are preferably provided in the side wall 3f of the combustor liner 3a to be asymmetric around the central axis of the combustor liner 3a. Since the plurality of ammonia injection holes 3b are disposed in this way, the gaseous ammonia injected from the ammonia injection holes 3b forms a combustion field which is non-uniform in the cross section of the combustor 3. Therefore, the burned ammonia gas having a relatively low temperature can collide with a portion of the deflection member which is conventionally likely to have a high temperature. Alternatively, the burned ammonia gas can flow along a portion which is likely to have a high temperature. It is possible to minimize damage such as thermal deformation or cracking due to a temperature difference in the deflection member 3g.

(3) In the above-described embodiment, although the ammonia (reducing ammonia) is used as a reducing agent, the present disclosure is not limited thereto. A reducing agent other than the ammonia (reducing ammonia) may be used.

(4) In the above-described embodiment, although the fuel supplied into the combustion chamber N from the burner 3c is the natural gas and the ammonia, the present disclosure does not limit the fuel as long as it is a combination of a fuel with a high flame temperature and a fuel with a low flame temperature.

(5) The ammonia combustion field 3i may be a supply region in which unburned ammonia gas is supplied. In this case, since the unburned ammonia gas is denitrated together with $NO_x$ by a denitrification device, the unburned ammonia gas does not leak from the gas turbine A.

According to the present disclosure, it is possible to minimize damage such as thermal deformation or cracking in the deflection member provided between the combustion chamber and the inlet of the turbine caused by a temperature difference.

What is claimed is:

1. A combustion device configured to burn fuel ammonia with combustion air in a combustion chamber, the combustion device comprising:
   a combustor liner which forms the combustion chamber;
   a burner which is installed at one end of the combustor liner, and is configured to supply a fuel having a flame temperature higher than that of the fuel ammonia into the combustion chamber to generate a combustion gas;
   a deflection member which is provided on a downstream side of the combustor liner in a flow direction of the combustion gas, and is configured to deflect the flow direction of the combustion gas; and
   at least one ammonia injection hole which is provided in the combustor liner between the burner and the deflection member and is configured to supply the fuel ammonia into the combustion chamber so as to form an ammonia combustion field that pushes away the combustion gas, wherein the at least one ammonia injection hole is configured to supply the fuel ammonia toward a part of an inner wall surface of the combustor liner facing the at least one ammonia injection hole such that a cross section of the combustor liner after the fule ammonia is injected from the at least one ammonia injection hole has a biased temperature distribution in which a high temperature portion is formed by the combustion gas pushed away by the ammonia combustion field, and a low temperature portion formed by the ammonia combustion field are present.

2. The combustion device according to claim 1, wherein the at least one ammonia injection hole is provided in a side wall of the combustor liner.

3. The combustion device according to claim 1, wherein:
the at least one ammonia injection hole includes a plurality of ammonia injection holes; and
the plurality of ammonia injection holes are provided in a side wall of the combustor liner to be asymmetric around a central axis of the combustion chamber.

4. The combustion device according to claim 1, wherein the high temperature portion includes a high temperature portion of the deflection member, and the at least one ammonia injection hole is disposed such that the fuel ammonia supplied from the at least one ammonia injection hole collides with the high temperature portion of the deflection member or flows along the high temperature portion of the deflection member, the high temperature portion of the deflection member being a portion in which a temperature within the high temperature portion of the deflection member is higher than an average temperature in the deflection member and which is identified in advance.

5. The combustion device according to claim 1, wherein the high temperature portion includes a high temperature portion includes a high temperature portion of the deflection member, and a supply amount of the fuel ammonia supplied from the at least one ammonia injection hole is configured such that the fuel ammonia supplied from the at least one ammonia injection hole collides with the high temperature portion of the deflection member or flows along the high temperature portion of the deflection member, the high temperature portion of the deflection member being a portion in which a temperature within the high temperature portion of the deflection member is higher than an average temperature in the deflection member and which is identified in advance.

6. The combustion device according to claim 1, wherein the burner is configured to supply the fuel ammonia and another fuel gas to provide the fuel having the flame temperature higher than the fuel ammonia.

7. The combustion device according to claim 6, wherein the another fuel gas includes natural gas.

8. The combustion device according to claim 1, wherein the ammonia combustion field from the at least one ammonia injection hole has a flame temperature lower than a temperature the combustion gas of the burner.

9. A gas turbine comprising the combustion device according to claim 1.

* * * * *